(12) United States Patent
Hsu et al.

(10) Patent No.: US 8,156,486 B2
(45) Date of Patent: Apr. 10, 2012

(54) PATCHING DEVICES AND METHODS THEREOF FOR PATCHING FIRMWARE FUNCTIONS

(75) Inventors: Hong-Kai Hsu, Taipei County (TW); Ting-Cheng Hsu, Hsinchu (TW); Wei-Lun Wan, Hsinchu (TW)

(73) Assignee: Mediatek Inc., Hsin-Chu (TW)

( * ) Notice: Subject to any disclaimer, the term of this patent is extended or adjusted under 35 U.S.C. 154(b) by 833 days.

(21) Appl. No.: 12/260,229

(22) Filed: Oct. 29, 2008

(65) Prior Publication Data

US 2010/0107149 A1    Apr. 29, 2010

(51) Int. Cl.
    G06F 9/44    (2006.01)
(52) U.S. Cl. .......................................... 717/168
(58) Field of Classification Search .................... 717/168
    See application file for complete search history.

(56) References Cited

U.S. PATENT DOCUMENTS

| | | | |
|---|---|---|---|
| 4,542,453 A * | 9/1985 | Patrick et al. ............... 714/6.13 |
| 4,610,000 A | 9/1986 | Lee |
| 5,481,713 A | 1/1996 | Wetmore et al. |
| 5,694,566 A | 12/1997 | Nagae |
| 5,799,144 A | 8/1998 | Mio |
| 5,802,549 A | 9/1998 | Goyal et al. |
| 5,901,225 A * | 5/1999 | Ireton et al. .................. 714/6.32 |
| 5,983,000 A | 11/1999 | Perron |
| 6,073,252 A | 6/2000 | Moyer et al. |
| 6,076,134 A | 6/2000 | Nagae |
| 6,128,751 A | 10/2000 | Yamamoto et al. |
| 6,237,120 B1 | 5/2001 | Shimada et al. |
| 7,596,721 B1 * | 9/2009 | Flake et al. ...................... 714/42 |
| 2006/0117313 A1 * | 6/2006 | Yeh et al. ...................... 717/168 |
| 2006/0174244 A1 * | 8/2006 | Woods et al. ................. 717/174 |
| 2007/0198787 A1 * | 8/2007 | Jessani et al. ................. 711/159 |
| 2008/0263533 A1 * | 10/2008 | Huque et al. .................. 717/168 |

* cited by examiner

*Primary Examiner* — Wei Zhen
*Assistant Examiner* — Junchun Wu
(74) *Attorney, Agent, or Firm* — Thomas|Kayden

(57) ABSTRACT

A patching device and method thereof for patching a firmware function by a patch function. When a fetch address from a processor does not correspond to the firmware function, the patching device outputs an instruction of the fetch address to respond to the processor. When the fetch address corresponds to the replaced firmware function, the patching device outputs an artificial instruction to respond to the processor. The artificial instruction is one of series of machine codes corresponding to a plurality of patch intermediary instructions utilized to direct the processor to jump to the beginning address of the patch function.

18 Claims, 17 Drawing Sheets

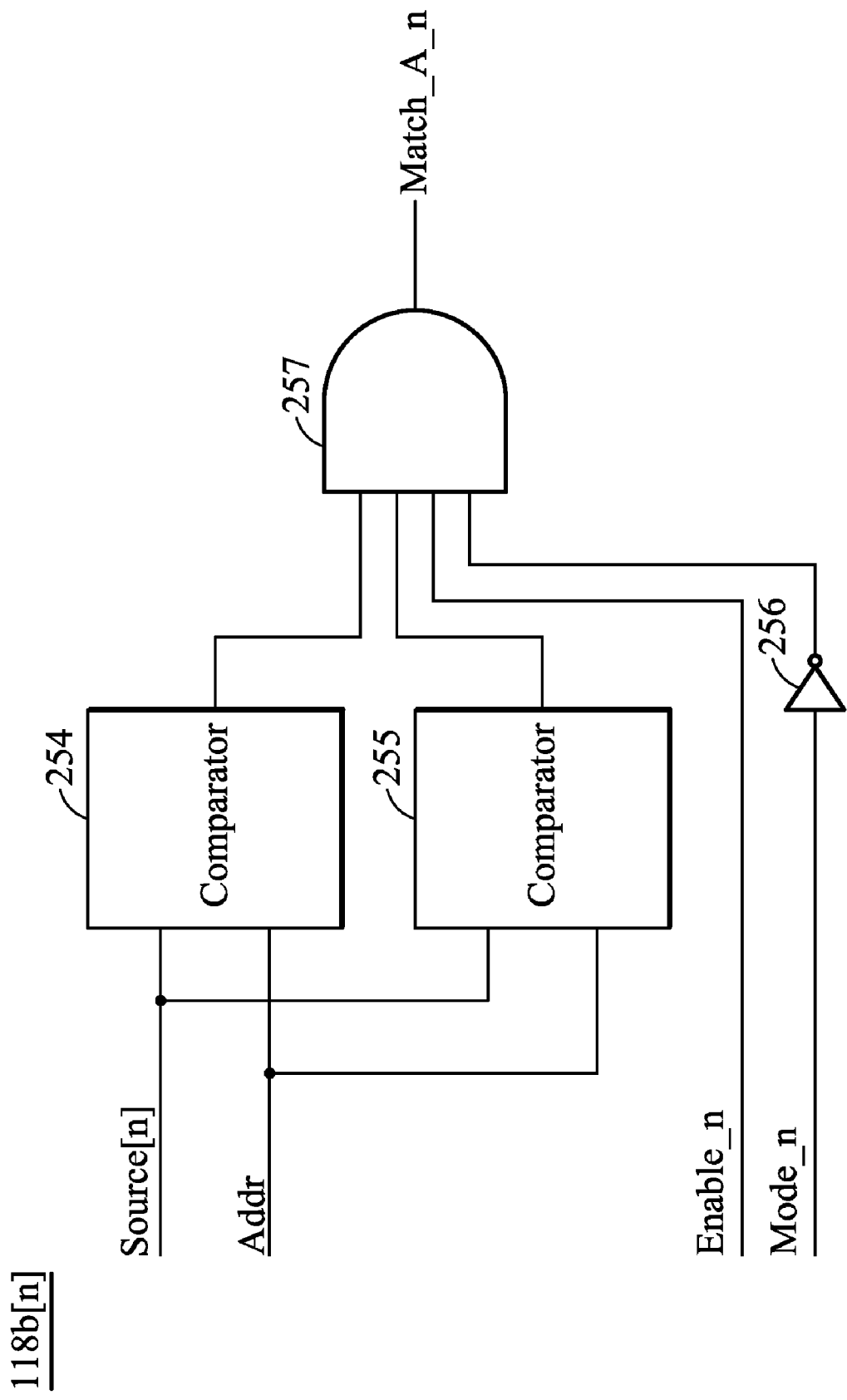

PATCHING DEVICES AND METHODS THEREOF FOR PATCHING FIRMWARE FUNCTIONS

BACKGROUND OF THE INVENTION

1. Field of the Invention

The present invention relates to firmware function patching and more particularly, relates to patching devices and methods thereof for patching firmware functions.

2. Description of the Related Art

Read-only memory (ROM) is usually used in an electronic apparatus to store firmware. Because data stored in ROM cannot be modified, ROM malfunctions when there is an error in the firmware.

To overcome the problem, conventional techniques use a flash ROM to replace ROM. Flash ROM is a non-volatile memory that can be electronically erased and reprogrammed. Flash ROM, however, is expensive.

BRIEF SUMMARY OF THE INVENTION

The invention discloses patching devices and methods thereof for patching firmware functions. In an embodiment of the invention, the patching device comprises a memory, an instruction generator, a first multiplexer, and a patch determination unit. The memory comprises a read-only memory (ROM) code region storing a plurality of firmware functions, and a patch function region storing a patch function provided to substitute for one of the firmware functions. The first multiplexer has two input terminals coupled to the memory and the instruction generator. The patch determination unit is coupled to the instruction generator and the first multiplexer, obtains a fetch address from a processor, and determines whether the fetch address corresponds to the replaced firmware function. When the fetch address does not correspond to the replaced firmware function, the patch determination unit directs the first multiplexer to output an instruction of the fetch address of the ROM code region to respond to the processor. When the fetch address corresponds to the replaced firmware function, the patch determination unit directs the first multiplexer to output an artificial instruction generated by the instruction generator to respond to the processor. The generated artificial instruction is one of series of machine codes corresponding to a plurality of patch intermediary instructions utilized to direct the processor to jump to the beginning address of the patch function.

In an embodiment of the invention, the method utilizing a patch function to substitute for at least one of plurality of firmware functions stored in a read-only memory (ROM) code region comprises obtaining a fetch address from a processor, obtaining a source address pointing to the beginning of the replaced firmware function, determining whether the fetch address falls into an address range between the source address and the source address plus a predetermined value, generating and responding with an artificial instruction to the processor when the fetch address falls into the address range; and fetching and responding with an instruction from the fetch address to the processor when the fetch address does not fall into the address range. The generated artificial instruction is one of series of machine codes corresponding to a plurality of patch intermediary instructions utilized to direct the processor to jump to the destination address.

The invention further discloses the electronic apparatus comprising a memory, a processor, and an instruction providing unit. The memory comprises a read-only memory (ROM) code region storing a plurality of firmware functions, and a patch function region storing a patch function provided to substitute for one of the firmware functions. The beginning of the replaced firmware function is indicated by a source address, and the beginning of the patch function is indicated by a destination address. The instruction providing unit is coupled to the memory and the processor to obtain a plurality of fetch addresses from the processor. When the fetch addresses from the source address do not exceed a predetermined value, the instruction providing unit responds with a plurality of artificial instructions to the processor. The generated artificial instruction is one of series of machine codes corresponding to a plurality of patch intermediary instructions utilized to direct the processor to jump to the destination address.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein:

FIG. 2D is a schematic diagram showing an embodiment of an ARM mode patch determination unit;

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
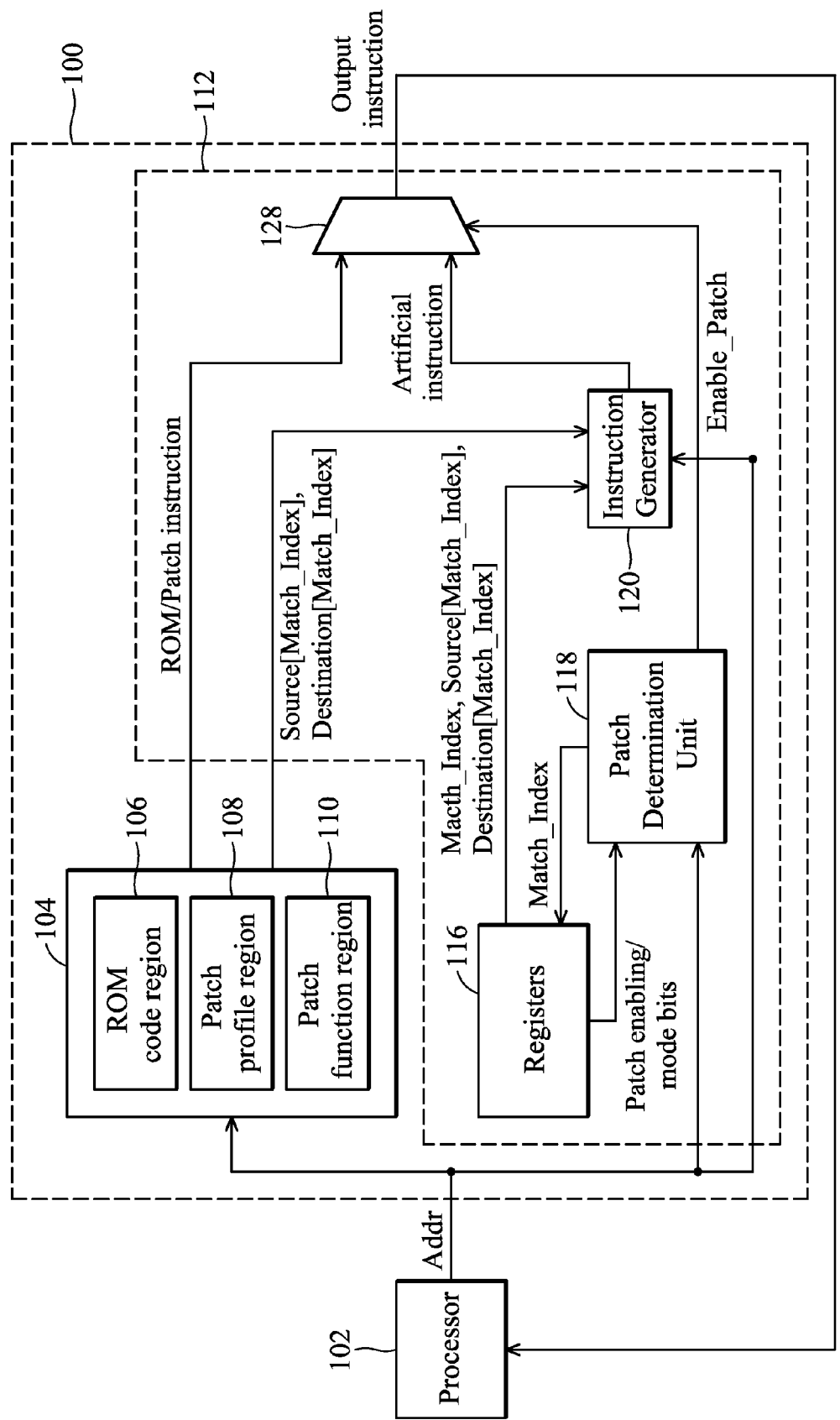
FIG. 1 is a block diagram showing an embodiment of an electronic apparatus comprising a patching device.

FIG. 1 is a block diagram showing an embodiment of an electronic apparatus mainly containing a patching device 100 and a processor 102. The processor 102 is a general-purposed processor. The patching device 100 contains at least a memory 104 and an instruction providing unit 112. The instruction providing unit 112 contains at least registers 116, a patch determination unit 118, an instruction generator 120, and a multiplexer 128. The memory 104 comprises a read only memory (ROM) code region 106 for storing firmware function, a patch profile region 108 for storing profile information, and a patch function region 110 for storing a plurality of patch functions each provided to substitute for one flawed firmware function. The ROM code region 106 may be allocated from a Read-Only Memory (ROM), or a read only region of a rewritable memory, such as a random access memory (RAM), a flash memory, or others. One or more firmware functions stored in the ROM code region 106 may be flawed and require to be replaced with patch functions stored in the patch function region 110. The patch function region 110 may be allocated from a rewritable memory, such as a RAM, a flash memory or others. The patch functions may be stored in the patch function region 110 before the processor 102 running the firmware functions of the region 106. The patch profile region 108 may be allocated from a rewritable memory, such as a RAM, a flash memory or others. The profile information may be stored in the patch profile region 108 before the processor 102 running the firmware functions of the region 106. Details of the patch profile region 108 are to be described in the following paragraphs. The processor 102 accesses each instruction by its memory address. The processor 102 typically contains a program counter, a register, which indicates where the system is in its instruction sequence. The program counter holds the address of the next instruction to be executed. The program counter is automatically incremented, for example by 4 or 2, for each instruction cycle so that instructions are normally retrieved sequentially from the memory 104. Certain instructions, such as branches and subroutine calls and returns, interrupt the sequence by placing a new value in the program counter.

In order to fetch an instruction to execute, the processor 102 sends an address "Addr" (also referred to as a fetch address) to the patching device 100. The patching device 100 determines whether the received address corresponds to a flawed function requiring to be patched. If so, an artificial instruction is generated and responded to the processor 102 in order to redirect the program execution to a relevant patch function. If not, the instruction at the address is responded to the processor 102. The following details the patching device 100 mainly containing a memory 104, registers 116, a patch determination unit 118, a code generator 120 and a multiplexer 128. The memory 104 contains at least a ROM code region 106, a patch profile region 108 and a patch function region 110, where the ROM code region 106 and the patch function region 110 store firmware functions and patch functions each may contain 32-bit (4-byte) or 16-bit (2-byte) instructions arranged in a continuous space. Registers 116 store information regarding which firmware function of the ROM code region 106 is required to be replaced with a relevant patch function of the patch function region 110. The patch determination unit 118 determines whether to enable patch according to the information cached in the registers 116. If so, the patch determination unit 118 stores a matching index in one of the registers 116 and enables the multiplexer 128 to output an artificial instruction generated by the instruction generator 120. If not, the patch determination unit 118 enables the multiplexer 128 to output an instruction at the received address of the ROM code region 106 or Patch function region 110. The code generator 120 generates an artificial instruction according to the information cached in the registers 116 and/or the patch profile region 108.

Figure 2A:
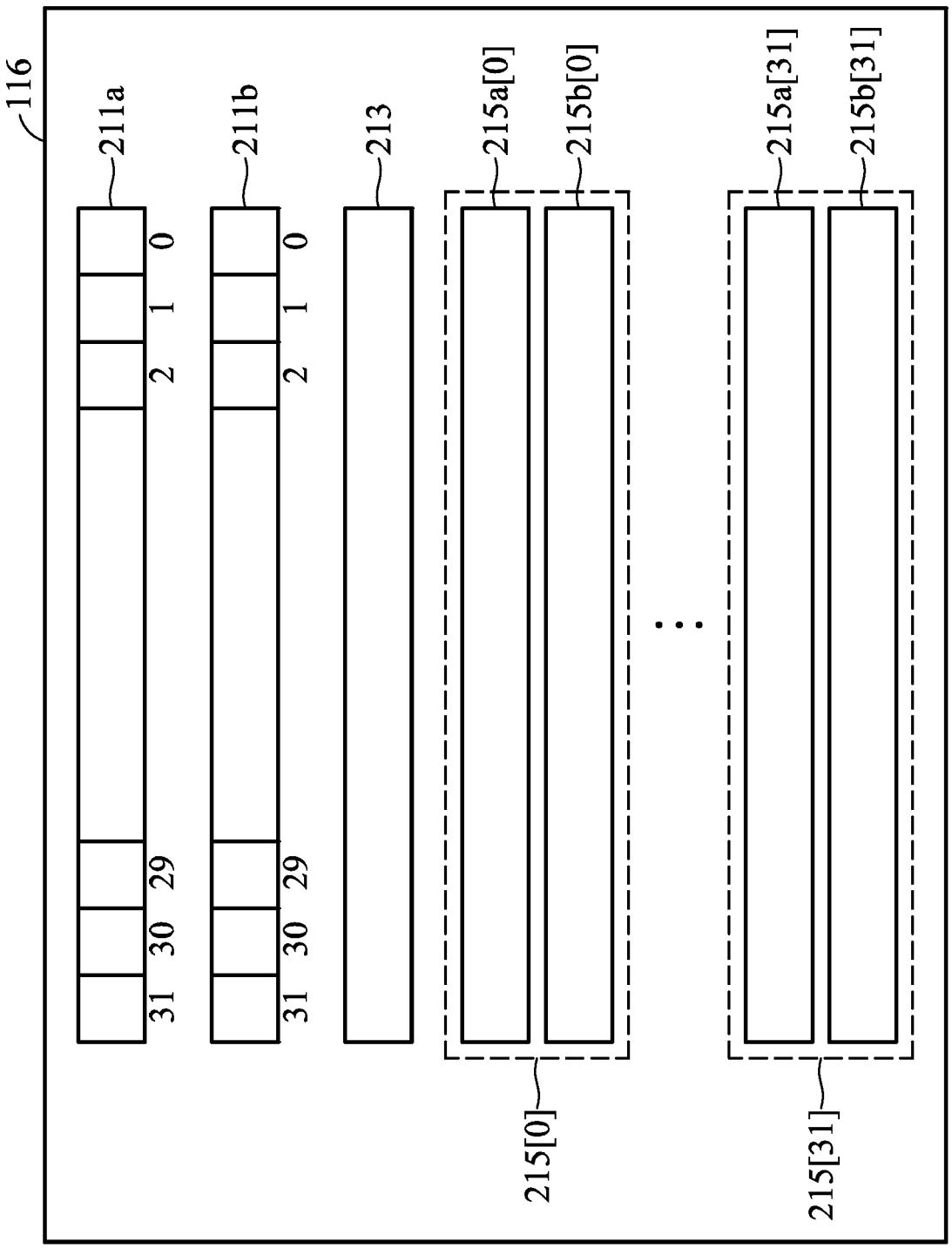
FIG. 2A is a schematic diagram showing an embodiment of registers.

This paragraph details the registers 116. FIG. 2A is a schematic diagram showing an embodiment of registers. Registers 116 contain at least a pair of a enabling register of 32 bits 211a and a mode register of 32 bits 211b, an index register 213, and thirty-two pairs of source address registers 215a[0] to 215a[31] and destination address registers 215b[0] to 215b[31]. That is, the electronic apparatus can replace at most thirty-two firmware function. For those skilled in the art can set the electronic apparatus to provide more or less patch capability, more or less pairs source address registers and destination address registers may be provided and actual bits consumed by each of the enabling register 211a and the mode register 211b are varied therewith. For example, each of the enabling register 211a and the mode register 211b consumes sixteen bits when sixteen pairs of source address registers and destination address registers are employed. The n-th bit of the enabling register 211a indicates whether the content of the n-th pair of source and destination address registers is available, where, for example, "1" represents that the n-th pair of source and destination address registers record the beginning addresses of a flawed function of the ROM code region 106 and a patch function of the patch function region 110 respectively and "0" represents the opposite. As the n-th bit of the enabling register 211a records "1", the n-th bit of the mode register 211b indicates whether the corresponding flawed or patch function is executed in "ARM" mode or "THUMB" mode, where, for example, "1" represents the corresponding flawed function executed in "THUMB" mode and "0" represents the opposite. It is to be understood that, each instruction of a function executed in "ARM" mode consumes four bytes (i.e. thirty-two bits) while each instruction of a function executed in "THUMB" mode consumes two bytes (i.e. sixteen bits). It is to be understood that a "THUMB" mode instruction consumes relatively less bits to indicate an offset to be jumped to than an "ARM" mode instruction and, as a result, the consumed bits are difficult to cover the whole range of the memory 104 to be jumped to. The index register 213 records a matching index corresponding to one of the available pair of the source and destination address registers, where generation details of the matching index are to be described in the following.

Figure 3:
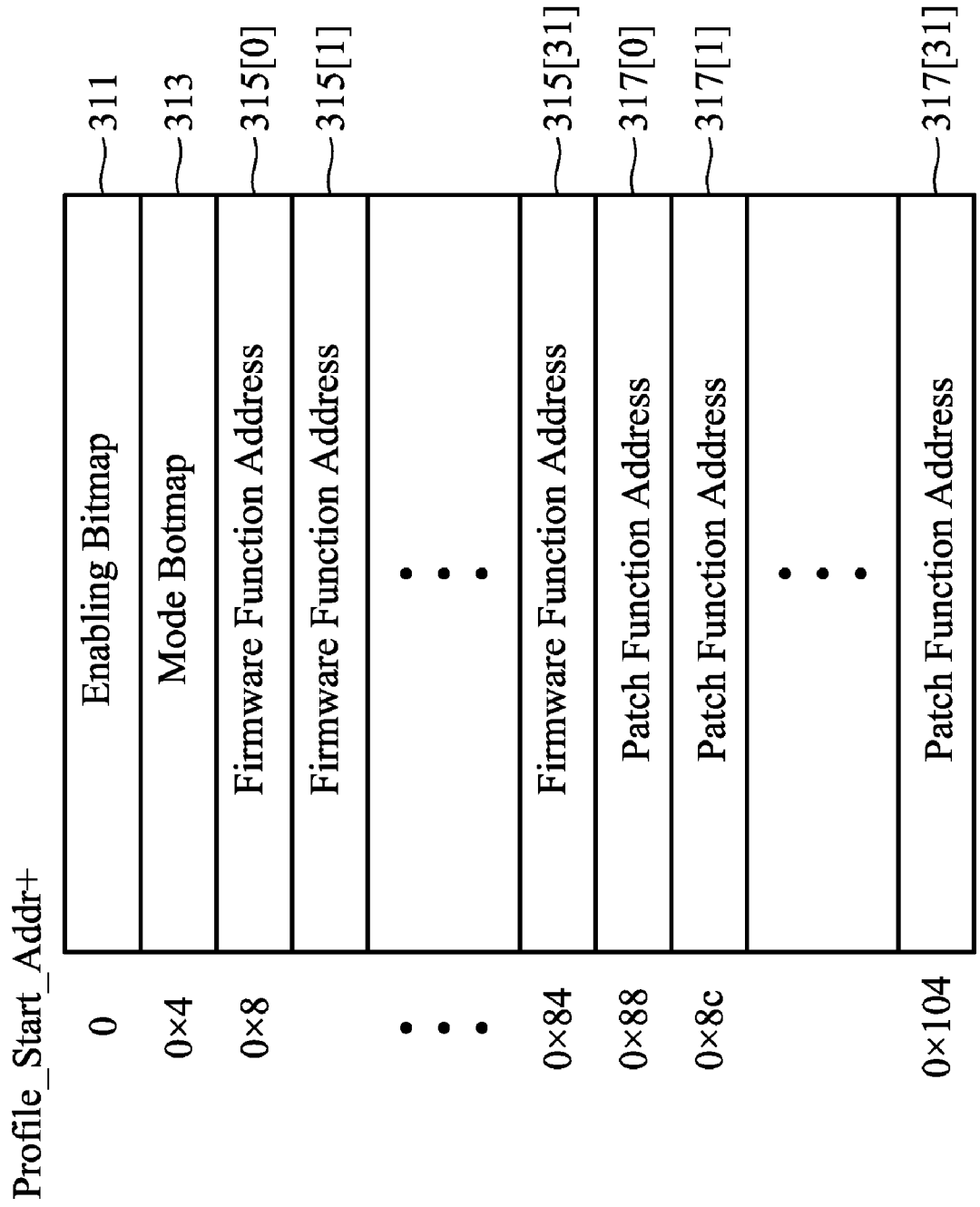
FIG. 3 is a schematic diagram showing the data structure of an embodiment of a patch profile region.

This paragraph details the patch profile region 108. FIG. 3 is a schematic diagram showing the data structure of an embodiment of a patch profile region. The patch profile region starts from a beginning address "Profile_Start_Addr". The patch profile region 108 contains at least an enabling bitmap of 32 bits (4 bytes) 311 and a mode bitmap of 32 bits 313, thirty-two 32-bit firmware function address records (i.e. source address records) 315[0] to 315[31] and thirty-two 32-bit patch function address records (i.e. destination address records) 317[0] to 317[31]. The enabling bitmap 311 and the mode bitmap 313 store the same information as that of the enabling register 211a and the mode register 211b respectively. The firmware function address records 315[0] to 315[31] stores the same information as that of the source address registers 215a[0] to 215a[31] respectively, and the patch function address records 317[0] to 317[31] stores the same information as that of the destination address registers 215b[0] to 215b[31] respectively.

Figure 2B:
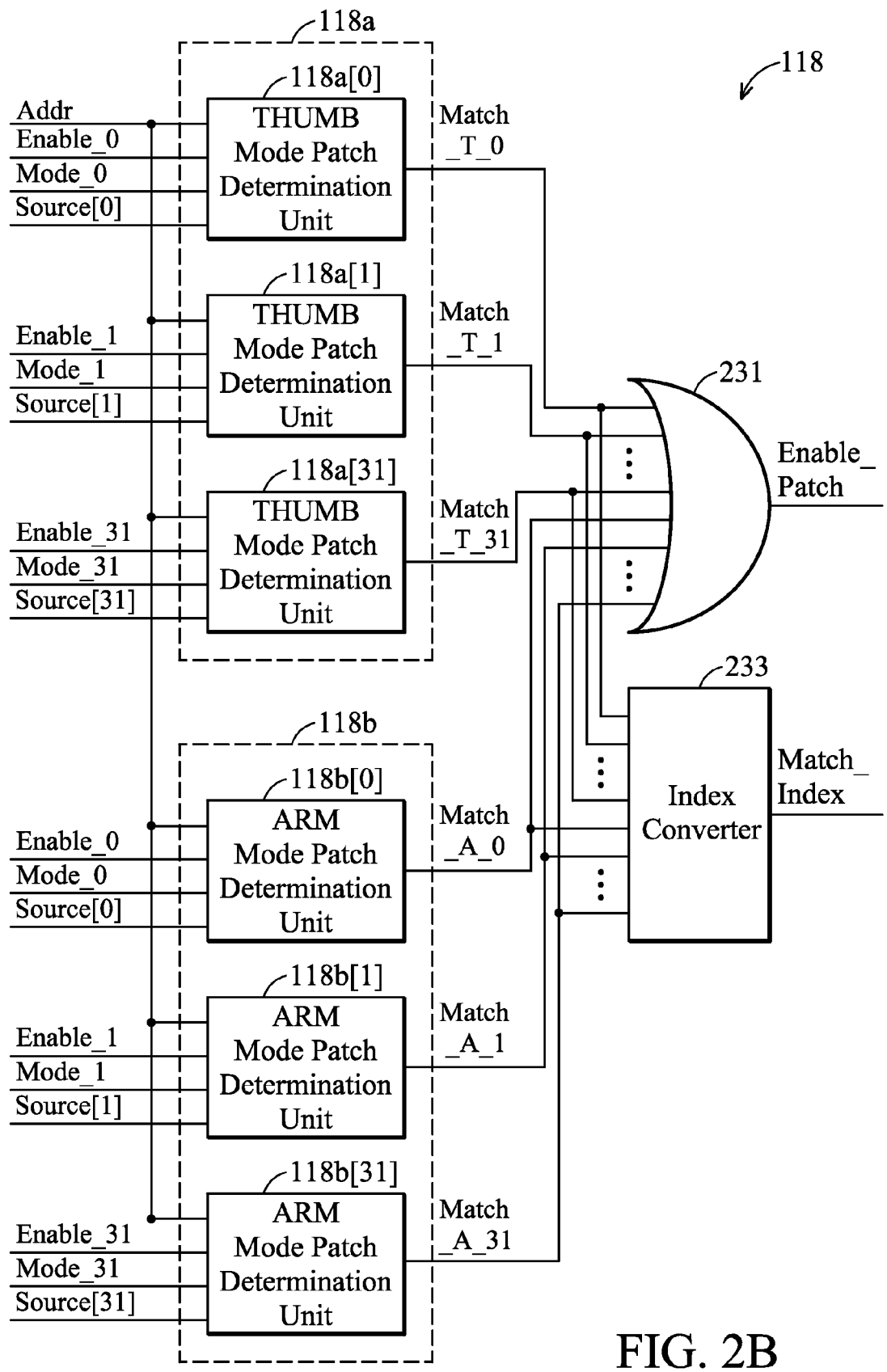
FIG. 2B is a schematic diagram showing an embodiment of a patch determination unit.

This paragraph details the patch determination unit 118. FIG. 2B is a schematic diagram showing an embodiment of a patch determination unit. For example, as the electronic apparatus is set to replace at most thirty-two firmware function, the patch determination unit 118 contains thirty-two THUMB mode patch determination units 118a[0] to 118a[31], thirty-two ARM mode patch determination units 118b[0] to 118b[31], an OR gate 231 and an index converter 233. For those skilled in the art can set the electronic apparatus to provide more or less patch capability, more or less pairs of source address registers and destination address registers may be provided. Each of the THUMB mode patch determination units 118a[0]~118a[31] and ARM mode patch determination units 118b[0]~118b[31], coupled to a processor (e.g. 102 of FIG. 1) and registers (e.g. 116 of FIG. 1), is employed to detect whether a patch function is present in the patch function region (e.g. 110 of FIG. 1), which the presence is indicated by a relevant bit of the enabling register (e.g. 211a of FIG. 2A), a relevant bit of the mode register (e.g. 211b of FIG. 2A), the address from the processor (e.g. 102 of FIG. 1) and a relevant source address of a source address register (e.g. one of 215a[0] to 215a[31] of FIG. 2A). The address is represented by "Addr". Bits of the enabling register are represented by "Enable_0" to "Enable_31". Bits of the mode register are represented by "Mode_0" to "Mode_31". The source address registers are represented by "Source[0]" to "Source[31]". For each THUMB or ARM mode patch determination unit, when detecting that a patch function is present, outputs a matching signal of "1" or "TRUE" as inputs of the OR gate 231 and the index converter 233, otherwise, outputs a matching signal of "0" or "FALSE". When one of the THUMB and ARM mode patch determination units outputs "1" or "TRUE", the OR gate 231 outputs a control signal of "1" or "TRUE", represented by "Enable_Patch", to direct a multiplexer (e.g. 128 of FIG. 1) to output an artificial instruction generated by an instruction generator (e.g. 120 of FIG. 1). The index converter 233 collects all matching signals and outputs an index "Match_Index" indicating which patch determination unit detects the presence of patch function. For example, the index converter 233 outputs a proprietary pattern (e.g. "0xFFFFFFFF") when all THUMB and ARM mode patch determination units output "0" or "FALSE", and outputs four when the THUMB mode patch determination unit 118a[4] outputs a matching signal of "1" or "TRUE". The output index "Match_Index" is subsequently stored in an index register (e.g. 213 of FIG. 2A) for future reference.

Figure 2C:
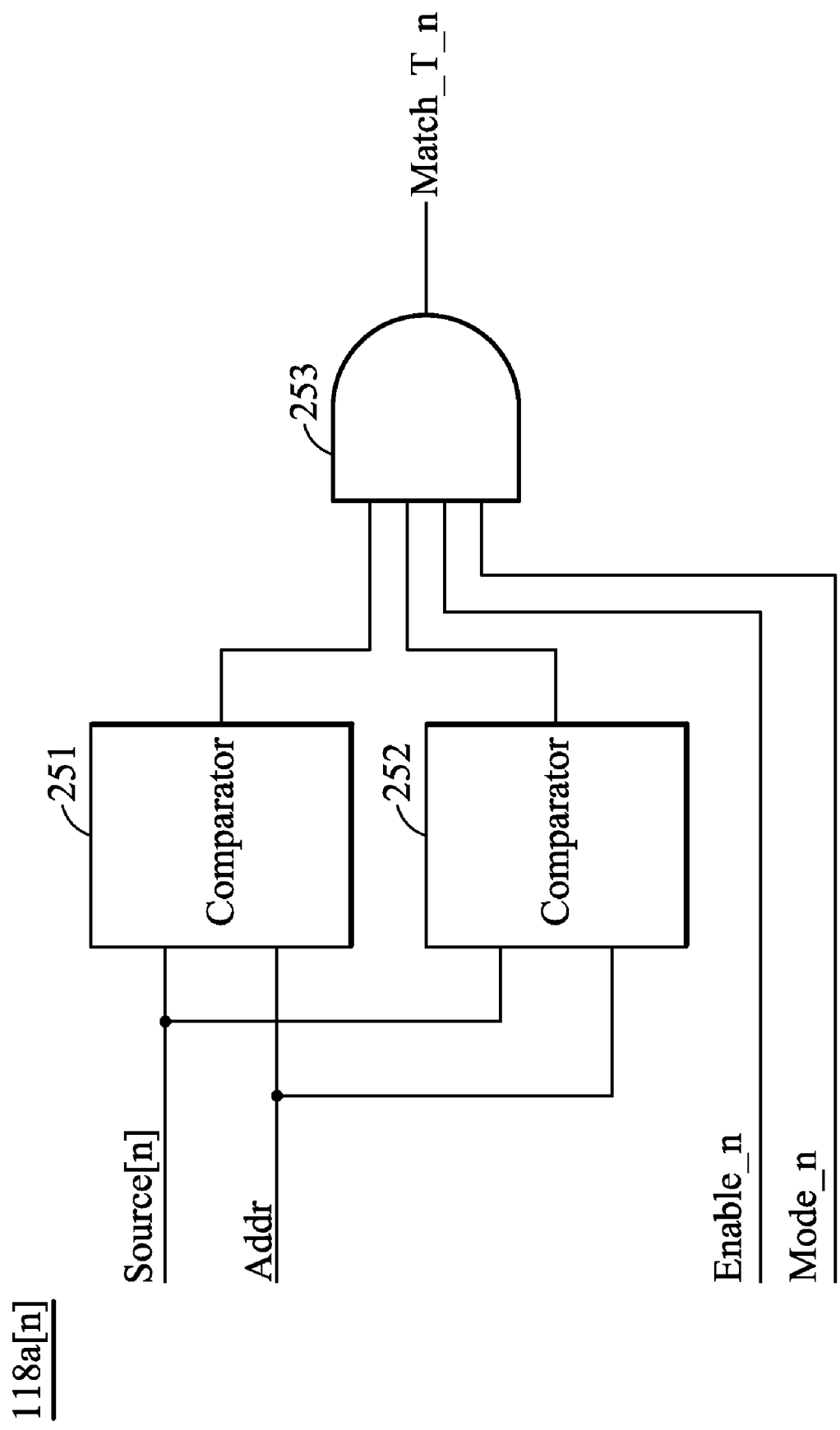
FIG. 2C is a schematic diagram showing an embodiment of a THUMB mode patch determination unit.

This paragraph details the THUMB mode patch determination units 118a[0] to 118a[31]. FIG. 2C is a schematic diagram showing an embodiment of a THUMB mode patch determination unit 118a[n] containing at least comparators 251 and 252, and an AND gate 253, where n represents a value between 0 and 31. Each of the comparators 251 and 252 obtains an address "Addr" from a processor (e.g. 102 of FIG. 1) and a source address "Source[n]" stored in the n-th source address register. The comparator 251 outputs "1" or "TRUE" when the address exceeds or equals the source address. The comparator 252 outputs "1" or "TRUE" when the address "Addr" is lower than the source address plus a range value (e.g. thirty-two). The AND gate 253 obtains outputs of the comparators 251 and 252, the n-th bit "Enable_n" of an enabling register (e.g. 211a of FIG. 2A), and the n-th bit "Mode_n" of a mode register (e.g. 211b of FIG. 2B) as its inputs. When all of the inputs are "1" or "TRUE", the AND gate 253 outputs a matching signal "Match_T_n" of "1" or "TRUE".

Figure 2E:
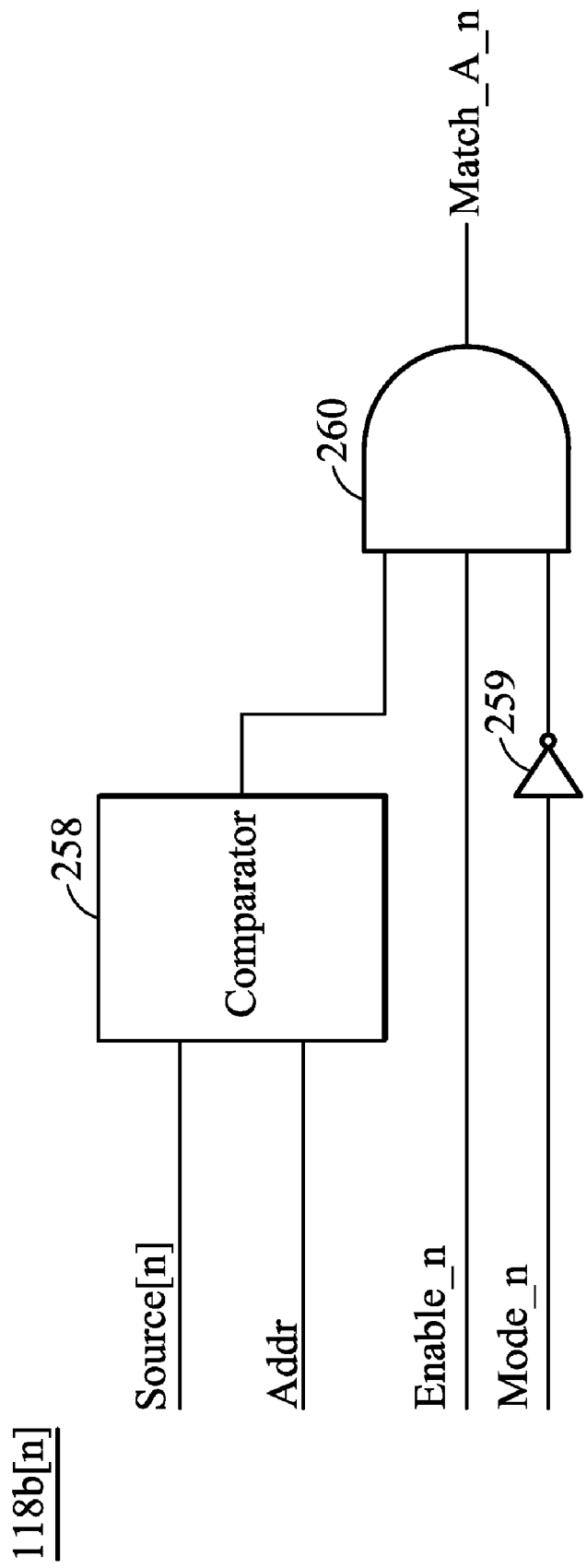
FIG. 2E is a schematic diagram showing another embodiment of an ARM mode patch determination unit.

This paragraph details the ARM mode patch determination units 118b[0] to 118b[31]. FIG. 2D is a schematic diagram showing an embodiment of an ARM mode patch determination unit 118b[n] containing at least comparators 254 and 255, an inverter 256, and an AND gate 257, where n represents a value between 0 and 31. Each of the comparators 254 and 255 obtains an address "Addr" from a processor (e.g. 102 of FIG. 1) and a source address "Source[n]" stored in the n-th source address register. The comparator 254 outputs "1" or "TRUE" when the address exceeds or equals the source address. The comparator 255 outputs "1" or "TRUE" when the address is lower than the source address plus a range value (e.g. thirty-six). The inverter 256 inverses the n-th bit "Mode_n" of a mode register (e.g. 211b of FIG. 2B) and outputs the inverse of "Mode_n". The AND gate 257 obtains outputs of the comparators 254 and 255, the inverter 256, and the n-th bit of an enabling register "Enable_n" (e.g. 211a of FIG. 2A) as its inputs. When all of the inputs are "1" or "TRUE", the AND gate 257 outputs a matching signal "Match_A_n" of "1" or "TRUE". FIG. 2E is a schematic diagram showing another embodiment of an ARM mode patch determination unit 118b[n] containing at least a comparator 258, an inverter 259, and an AND gate 260, where n represents a value between 0 and 31. The comparators 258 obtains an address "Addr" from a processor (e.g. 102 of FIG. 1) and a source address "Source[n]" stored in the n-th source address register, and outputs "1" or "TRUE" when the address equals the source address. The inverter 259 inverses the n-th bit "Mode_n" of a mode register (e.g. 211b of FIG. 2B) and outputs the inverse of "Mode_n". The AND gate 260 obtains outputs of the comparator 258, the inverter 259, and the n-th bit of an enabling register "Enable_n" (e.g. 211a of FIG. 2A) as its inputs. When all of the inputs are "1" or "TRUE", the AND gate 260 outputs a matching signal "Match_A_n" of "1" or "TRUE".

Figure 2F:
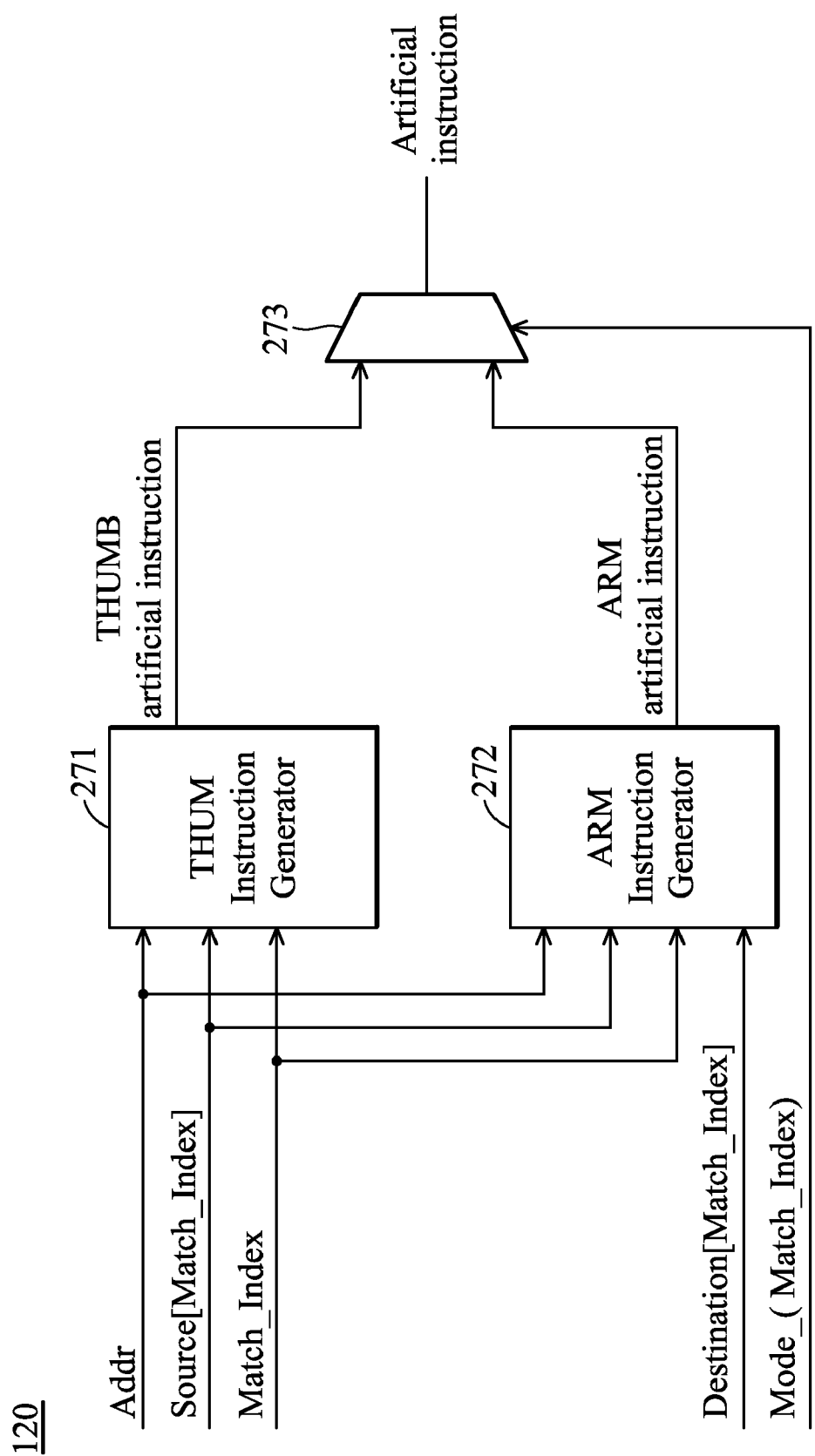
FIG. 2F is a schematic diagram showing an embodiment of an instruction generator.

This paragraph details the instruction generator 120. FIG. 2F is a schematic diagram showing an embodiment of an instruction generator containing at least a THUMB instruction generator 271, an ARM instruction generator 272 and a multiplexer 273. The THUMB instruction generator 271, coupled to a processor (e.g. 102 of FIG. 1), registers (e.g. 116 of FIG. 1) and a memory (e.g. 104 of FIG. 1), is employed to obtain an address from a processor (e.g. 102 of FIG. a) and a value "Match_Index" from an index register (e.g. 213 of FIG. 2A). The THUMB instruction generator 271, when the obtained value "Match_Index" indicates that the obtained address corresponding to a firmware function of a ROM code region requires to be replaced, may obtain a source address "Source[Match_Index]" of the (Match_Index)-th source address register (e.g. one of 215a[0] to 215a[31] of FIG. 2A) and a destination address "Destination[Match_Index]" of the (Match_Index)-th destination address register from a destination register (e.g. one of 215b[0] to 215b[31] of FIG. 2A) or from a patch profile region of a memory (e.g. 108 of FIG. 1), generate and output a series of THUMB artificial instructions according to the obtained addresses "Addr", "Source[Match_Index]" and "Destination[Match_Index]". The ARM instruction generator 272, coupled to a processor (e.g. 102 of FIG. 1), registers (e.g. 116 of FIG. 1) and a memory (e.g. 104 of FIG. 1), is employed to obtain an address from a processor (e.g. 102 of FIG. 1) and a value "Match_Index" from an index register (e.g. 213 of FIG. 2A). Accompanying with the embodiment of ARM mode patch determination unit 118b[Match_Index] of FIG. 2D, the ARM instruction generator 272, when the obtained value "Match_Index" indicates that the obtained address corresponding to a firmware function of a ROM code region requires to be replaced, may perform similar but different operations to generate and output a series of ARM artificial instructions according to the obtained addresses "Addr", "Source[Match_Index]" or "Destination[Match_Index]", or any combination thereof. Accompanying with the embodiment of ARM mode patch determination unit 118b[Match_Index] of FIG. 2E, The ARM instruction generator 272, when the obtained value "Match_Index" indicates that the obtained address corresponding to a firmware function of a ROM code region requires to be replaced, may generate and output one ARM artificial instruction according to the obtained addresses "Addr", "Source[Match_Index]" and "Destination[Match_Index]". The multiplexer 273, coupled to the outputs of the THUMB instruction generator 271 and the ARM instruction generator 272, selectively outputs the THUMB artificial instruction and the ARM artificial instruction according to the (Match_Index)-th bit of a mode register (e.g. 211b of FIG. 2A). Specifically, the multiplexer 273 outputs the THUMB artificial instruction when the (Match_Index)-th bit of the mode register is "1", otherwise, outputs the ARM artificial instruction.

Figure 2G:
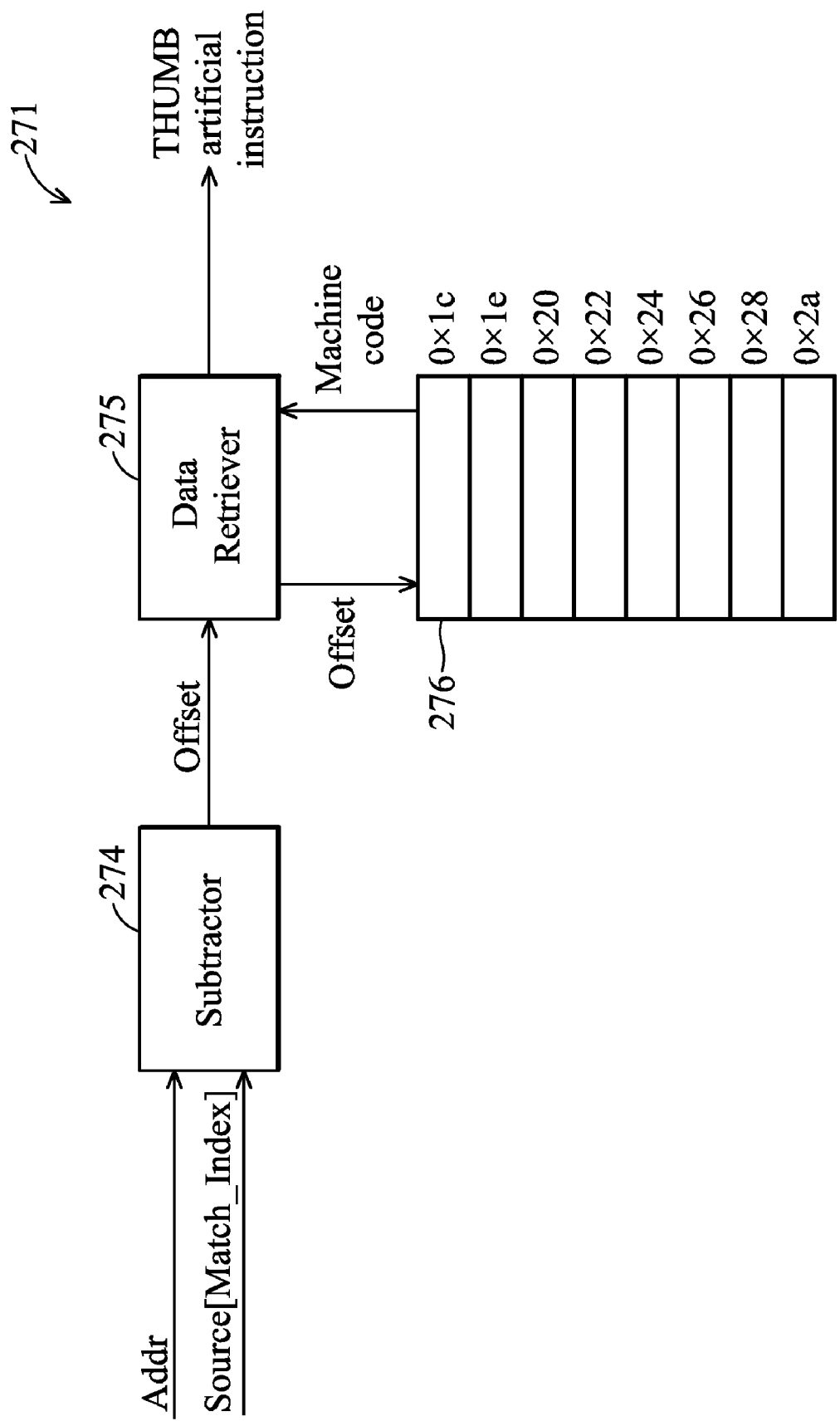
FIG. 2G is a schematic diagram showing an embodiment of a THUMB instruction generator.

The following paragraphs detail the THUMB instruction generator 271. Accompanying with the THUMB mode patch determination unit 118a[Match_Index] of FIG. 2C, FIG. 2G is a schematic diagram showing an embodiment of a THUMB instruction generator containing at least a subtractor 274, a data retriever 275 and a lookup table 276. The lookup table 276 may be implemented in a memory (e.g. 104 of FIG. 1), registers (e.g. some of 116 of FIG. 1), or others, and contains a series of machine code corresponding to the THUMB patch intermediary instructions. Exemplary machine code and related THUMB patch intermediary instructions may be listed in the following table.

TABLE 1

| Address | Machine Code | THUMB patch intermediary instructions |
|---|---|---|
| 0x0000001c | b506 | PUSH {r1, r2, r14} |
| 0x0000001e | 4903 | LDR r1, patch_idx |
| 0x00000020 | 4a03 | LDR r2, patch_fp |
| 0x00000022 | 1852 | ADD r2, r2, r1 |
| 0x00000024 | 6812 | LDR r2, [r2] |
| 0x00000026 | 4790 | BLX r2 |
| 0x00000028 | bd06 | POP {r1, r2, pc} |
| 0x0000002c | 02000008 | DCD patch_idx |
| 0x00000030 | 01000000 | DCD patch_fp |

When executing machine code of the instruction "PUSH {r1, r2,r14}", the processor pushes values of registers "r1", "r2" and "r14" into a stack, where register "r14" stores a return address. When executing machine codes of the instructions "LDR r1, patch_idx" and "LDR r2, patch_fp", the processor stores values of variables "patch_idx" and "patch_fp" in registers "r1" and "r2" respectively, where the value of "patch_fp" points to a start address of a patch function region (e.g. 110 of FIG. 1) and the value of "patch_idx" indicates a offset from the beginning of the patch function region, and the offset is "Match_Index" multiplying by four. When executing machine code of the instruction "ADD r2,r2,r1", the processor adds the value of the register "r1" to the value of the register "r2" and stores the calculation result in the register "r2", where the calculation result points to an address of the [Match_Index]-th destination address record. It is to be understood that the THUMB patch intermediary instructions may be devised to directly retrieve the destination address "Destination[Match_Index]" of the (Match_Index)-th destination address register from a destination register (e.g. one of 215b[0] to 215b[31] of FIG. 2A) and store the retrieved address in the register "r2". When executing machine code of the instruction "LDR r2, [r2]", the processor fetches a value of an address pointed by the value of the register "r2" and stores the fetched value in the register "r2", where the fetched value points to a start address of the "Match_Index"-th patch function of a patch function region (e.g. 110 of FIG. 1). When executing machine codes of the instructions "BLX r2", the processor jumps to an address pointed to by the value of the register "r2" so as to bypass the corresponding firmware function and execute the [Match_Index]-th patch function. When executing machine code of the instruction "POP {r1, r2,pc}", the processor pops out three values of the stack and stores in registers "r1", "r2" and the program counter in sequence.

Figure 2H:
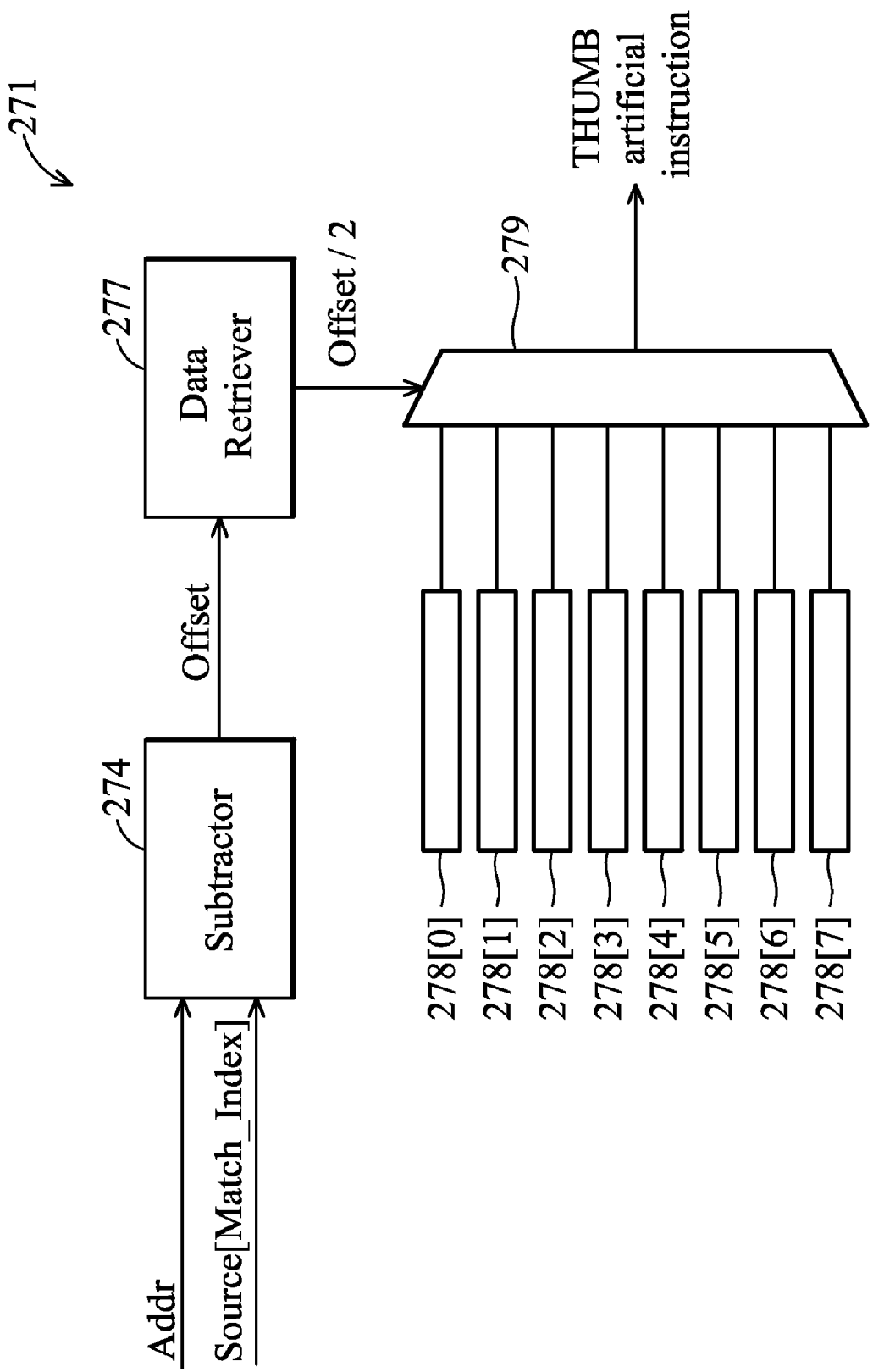
FIG. 2H is a schematic diagram showing another embodiment of a THUMB instruction generator.

The subtractor 274 subtracts an address received from a processor (e.g. 102 of FIG. 1) from a source address "Source[Match_Index]" of the (Match_Index)-th source address register (e.g. one of 215a[0] to 215a[31] of FIG. 2A) or of the (Match_Index)-th source address record (e.g. one of 315[0] to 315[31] of FIG. 3) to obtain an offset and outputs the obtained offset to the data retriever 275. The data retriever 275 may be a direct memory access (DMA) controller, retrieves machine code from the lookup table 276 according to the received offset and outputs the retrieved machine code as a THUMB artificial instruction. Accompanying with the THUMB mode patch determination unit 118a[Match_Index] of FIG. 2C, FIG. 2H is a schematic diagram showing another embodiment of a THUMB instruction generator containing at least the subtractor 274, a data retriever 277, a multiplexer 279 and a series of code generation units 278[0] to 278[7]. The code generation units 278[0] to 278[6] generate machine code shown in the second to eighth rows of Table 1. The subtractor 274 subtracts an address received from a processor (e.g. 102 of FIG. 1) from a source address "Source[Match_Index]" of the (Match_Index)-th source address register (e.g. one of 215a[0] to 215a[31] of FIG. 2A) or of the (Match_Index)-th source address record (e.g. one of 315[0] to 315[31] of FIG. 3) to obtain a offset and outputs the obtained offset to the data retriever 277. The data retriever 277 divides the received offset by two and controls the multiplexer 279 to output machine code of the (offset/2)-th code generation unit as a THUMB artificial instruction.

Figure 2I:
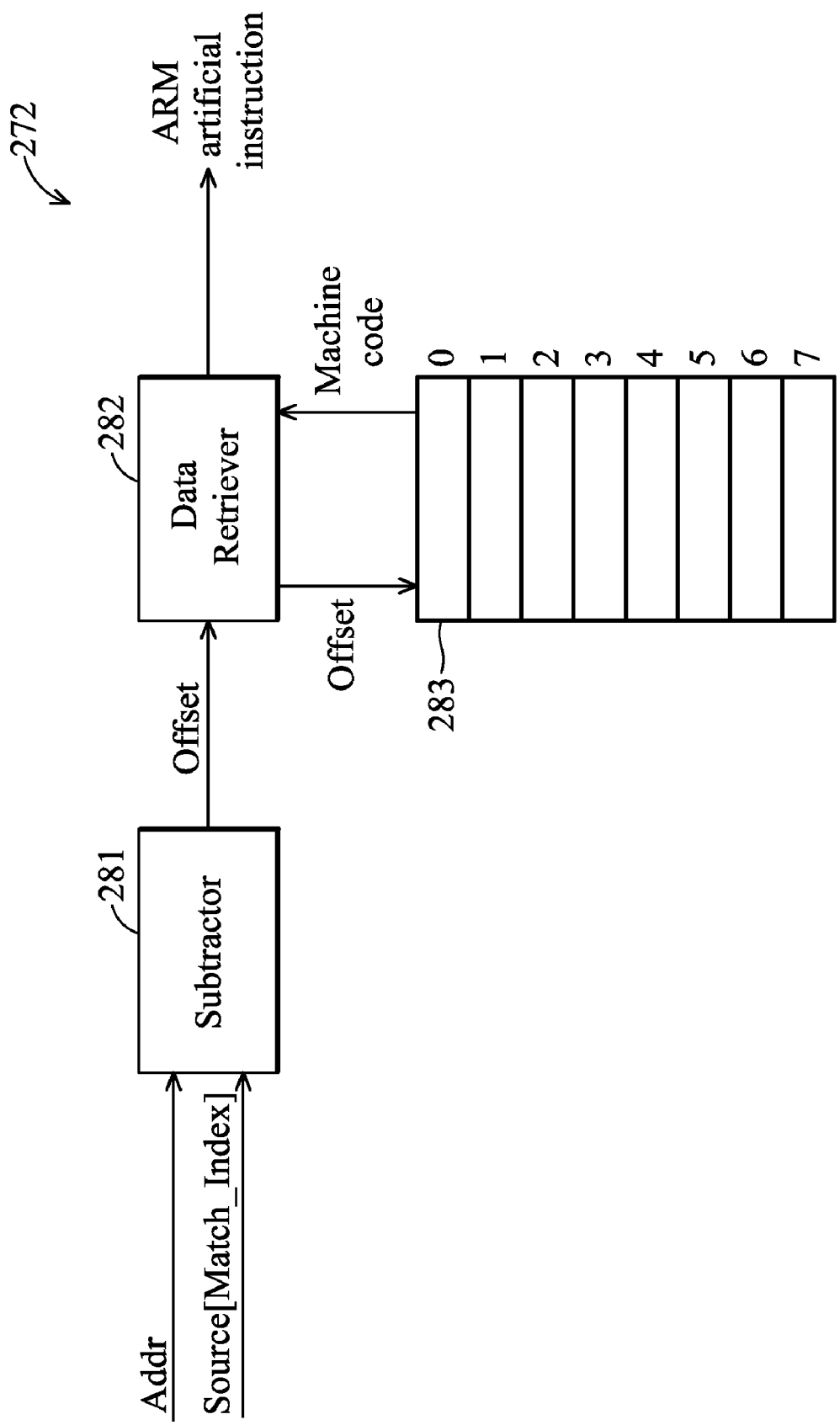
FIG. 2I is a schematic diagram showing an embodiment of an ARM instruction generator.

The following paragraphs detail the ARM instruction generator 272. Accompanying with the ARM mode patch determination unit 118b[Match_Index] of FIG. 2D, FIG. 2I is a schematic diagram showing an embodiment of an ARM instruction generator containing at least a subtractor 281, a data retriever 282 and a lookup table 283. The lookup table 283 may be implemented in a memory (e.g. 104 of FIG. 1), registers (e.g. some of 116 of FIG. 1), or others, and contains a series of machine code corresponding to ARM patch intermediary instructions. Exemplary machine code and related ARM patch intermediary instructions may be listed in the following table.

TABLE 2

| Address | Machine Code | ARM patch intermediary instructions |
|---|---|---|
| 0x00000000 | e92d4002 | STMFD r13!, {r1, r14} |
| 0x00000004 | e59f1024 | LDR r1, patch_fp |
| 0x00000008 | e5911000 | LDR r1, [r1, #0] |
| 0x0000000c | e59fe020 | LDR r14, patch_idx |
| 0x00000010 | e79ee101 | LDR r14, [r14, r1, LSL #2] |
| 0x00000014 | e12fff3e | BLX r14 |
| 0x00000018 | e8bd8002 | LDMFD r13!, {r1, pc} |
| 0x0000002c | 02000008 | DCD patch_idx |
| 0x00000030 | 01000000 | DCD patch_fp |

When executing machine code of the instruction "STMFD r13!,{r1,r14}", the processor pushes values of registers "r1" and "r14" into a stack, where register "r14" stores a return address and a start address of the stack is pointed by a value of a register "r13". Detailed operations for executing machine code of the instruction "LDR r1, patch_fp", "LDR r1,[r1, #0]", "LDR r14, patch_idx", "LDR r14,[r14,r1,LSL #2]" and "BLX r14" by the processor are well-known in the art and can be deduced by the analogy with reference to descriptions of Table 1. It is to be understood that the ARM patch intermediary instructions may be devised to directly retrieve the destination address "Destination[Match_Index]" of the (Match_Index)-th destination address register from a destination register (e.g. one of 215*b*[0] to 215*b*[31] of FIG. 2A) and store the retrieved address in the register "r14". When executing machine code of the instruction "LDMFD r13!,{r1, pc}", the processor pops values out of the stack and stores in registers "r1" and the program counter in sequence.

Figure 2J:
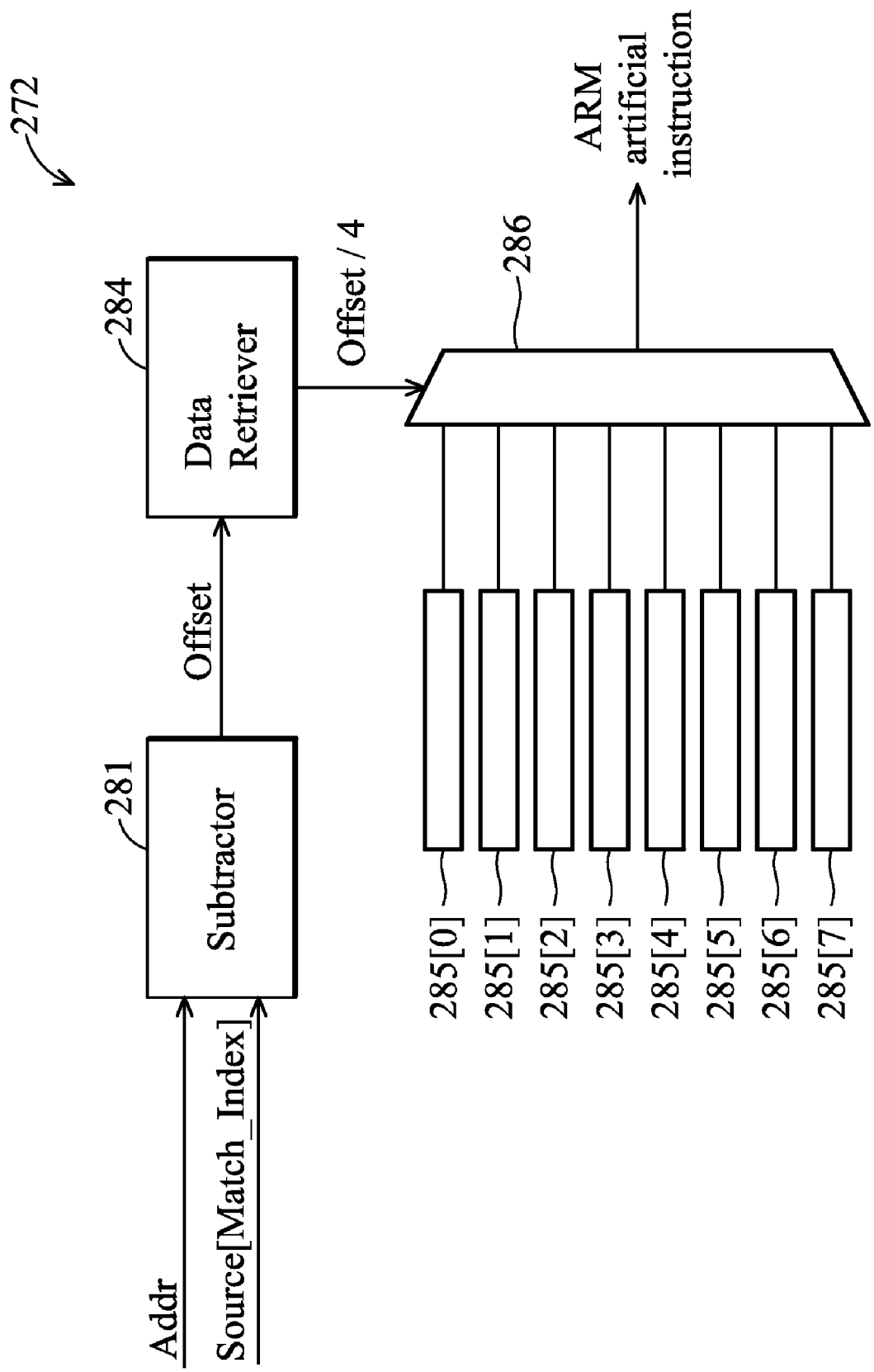
FIG. 2J is a schematic diagram showing another embodiment of an ARM instruction generator.

The subtractor 281 subtracts an address received from a processor (e.g. 102 of FIG. 1) from a source address "Source [Match_Index]" of the (Match_Index)-th source address register (e.g. one of 215*a*[0] to 215*a*[31] of FIG. 2A) or of the (Match_Index)-th source address record (e.g. one of 315[0] to 315[31] of FIG. 3) to obtain a offset and outputs the obtained offset to the data retriever 282. The data retriever 282 may be a direct memory access (DMA) controller, retrieves machine code from the lookup table 283 according to the received offset and outputs the retrieved machine code as an ARM artificial instruction. Accompanying with the ARM mode patch determination unit 118*b*[Match_Index] of FIG. 2D, FIG. 2J is a schematic diagram showing another embodiment of an ARM instruction generator containing at least the subtractor 281, a divider 284, a multiplexer 286 and a series of code generation units 285[0] to 285[7]. The code generation units 285[0] to 285[7] generate machine code shown in the second to eighth rows of Table 2. The subtractor 281 subtracts an address received from a processor (e.g. 102 of FIG. 1) from a source address "Source[Match_Index]" of the (Match_Index)-th source address register (e.g. one of 215*a*[0] to 215*a*[31] of FIG. 2A) or of the (Match_Index)-th source address record (e.g. one of 315[0] to 315[31] of FIG. 3) to obtain a offset and outputs the obtained offset to the data retriever 284. The data retriever 284 divides the received offset by four and controls the multiplexer 286 to output machine code of the (offset/4)-th code generation unit as an ARM artificial instruction.

Figure 2K:
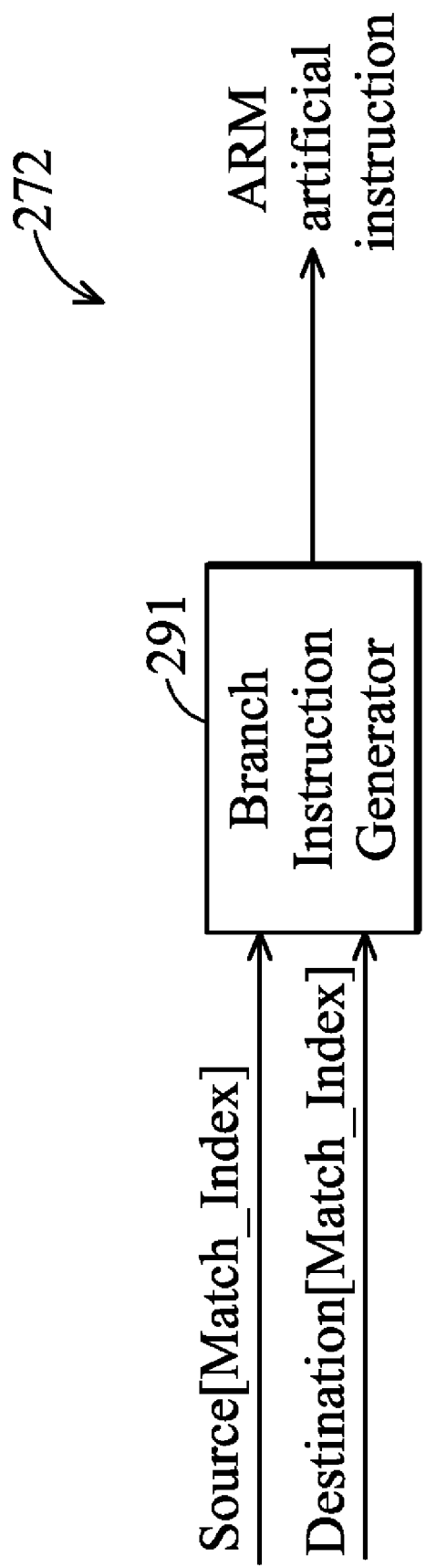
FIG. 2K is a schematic diagram showing another embodiment of an ARM instruction generator.

Accompanying with the ARM mode patch determination unit 118*b*[Match_Index] of FIG. 2E, FIG. 2K is a schematic diagram showing another embodiment of an ARM instruction generator containing at least a branch instructor generator 291. The branch instruction generator 291 obtains a destination address "Destination[Match_Index]" from the (Match_Index)-th destination address register (e.g. one of 215*b*[0] to 215*b*[31] of FIG. 2A) or the (Match_Index)-th destination address record (e.g. one of 317[0] to 317[31] of FIG. 3), and obtains a source address "Source[Match_Index]" of the (Match_Index)-th source address register (e.g. one of 215*a*[0] to 215*a*[31] of FIG. 2A) or the (Match_Index)-th source address record (e.g. one of 315[0] to 315[31] of FIG. 3). The branch instruction generator 291 subsequently generates and outputs a branch instruction according to the obtained source and destination addresses. The format of the branch instruction may be shown in FIG. 4. For example, the branch instruction generator 291 calculates the content of signed_immed_ 24 by subtracting the source address "Source[Match_Index]" plus eight from the destination address "Destination[Match_ Index]" and then rightward shifting the subtracting result by two bits. It is to be understood that, when executing the branch instruction, a processor (e.g. 102 of FIG. 1) directly jumps to the destination address "Destination[Match_Index]".

Figure 5:
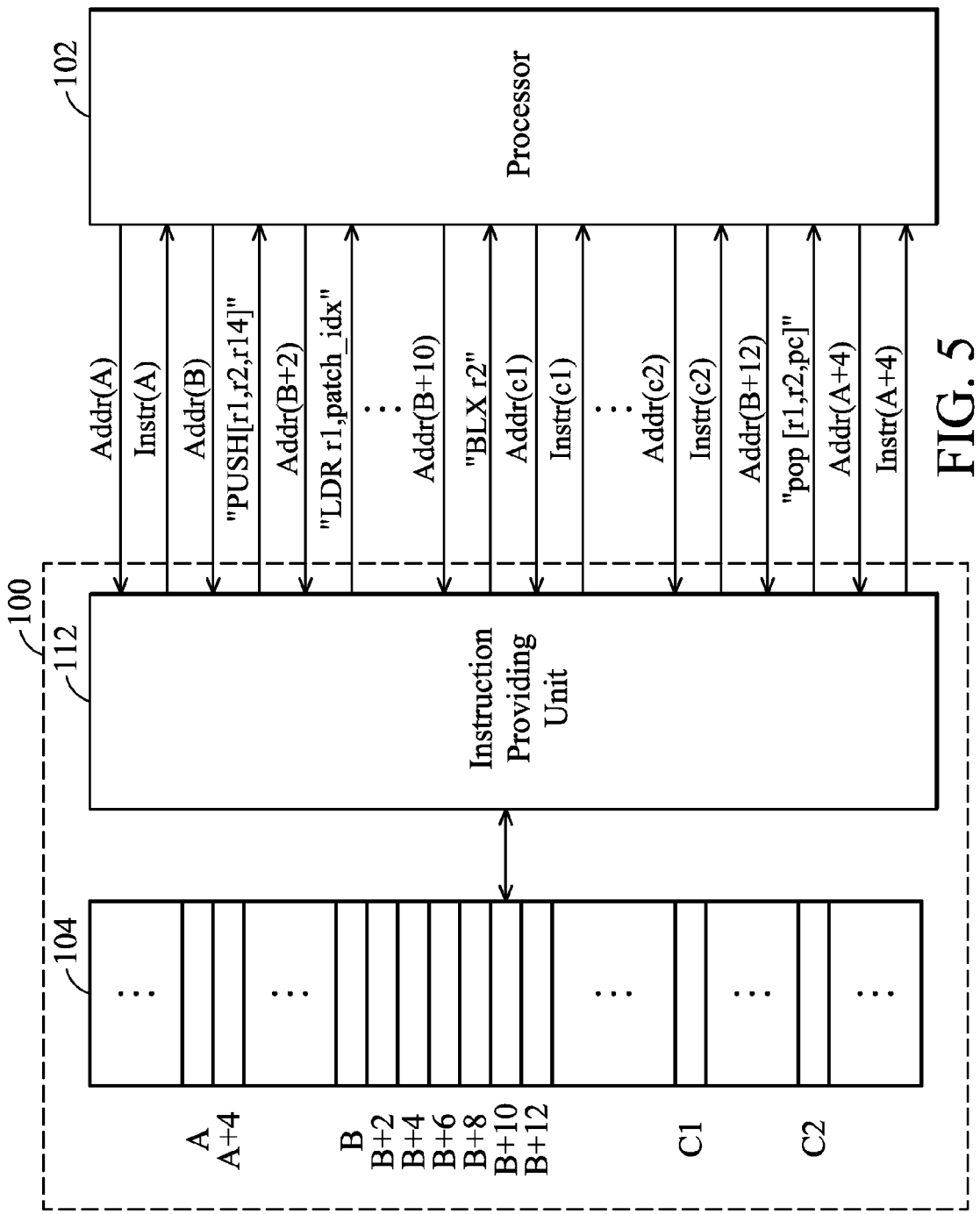
FIG. 5 is a schematic diagram illustrating exemplary operations between a patching device and a processor.

FIG. 5 is a schematic diagram illustrating exemplary operations between the patching device 100 and the processor 102. A flawed THUMB mode firmware function may start from address B, and the corresponding patch function may start from address C1. Address B and address C1 may be initially stored in a source address register (e.g. 215*a*[0] of FIG. 2A) and a destination address register (e.g. 215*b*[0] of FIG. 2A) respectively. Moreover, address B and address C1 may also be initially stored in a source address record (e.g. 315[0] of FIG. 3) and a destination address record (e.g. 317[0] of FIG. 3). Bit 0 of an enabling register (e.g. 211*a* of FIG. 2A) is set to "1" and bit 0 of a mode register (e.g. 211*b* of FIG. 2A) is set to "1". Assume that an instruction of an address A is branch-with-link instruction to cause a jump to the address B and to be returned to an address A+4 (i.e. the next of the branch-with-link instruction).

In the firmware execution, the processor 102 attempts to fetch an instruction from the address A. After receiving the address A from the processor 102, the patching device 100 returns the branch-with-link instruction of the address A to the processor 102. During execution of the returned branch instruction, the processor 102 first stores the address of A+4 into the "link" register, calculates a jump address B according to the returned branch instruction, updates the program counter with the address B and directs the patching device 100 to return an instruction from the address B. According to the above description of FIGS. 2B, 2C, 2F, 2G and 2H, after receiving the address B from the processor 102, the patching device 100 generates a machine code of an THUMB mode patch intermediary instruction "PUSH {r1,r2,r14}" and returns the generated code to the processor 102, instead of the instruction of the address B, resulting in the processor 102 to push values of registers "r1", "r2" and "r14" into a stack. Similarly, when receiving the addresses (B+2) to (B+8) in sequence, the patching device 100 sequentially generates machine codes of THUMB mode patch intermediary instructions "LDR r1, patch_idx", "LDR r2, patch_fp", "ADD r2,r2, r1" and "LDR r2, [r2]" and returns the generated code to the processor 102, instead of the instruction of the addresses (B+2) to (B+8). After receiving the address (B+10) from the processor 102, the patching device 100 generates a machine code of an THUMB mode patch intermediary instruction "BLX r2" and returns the generated code to the processor 102, instead of the instruction of the address (B+10), resulting in the processor 102 to execute a designated patch function. During execution of the returned code of "BLX r2", the processor 102 first stores the address of B+12 into the "link" register, updates the program counter with the address C1 and directs the patching device 100 to return an instruction from the address C1. After that, instructions C1 to C2 of the designated patch function are sequentially fetched and executed by the processor 102. During execution of the return instruction C2, the processor 102 reads the "link" register to acquire the address (B+12) and directs the patching device 100 to return an instruction from the address (B+12). After receiving the address (B+12) from the processor 102, the patching device 100 generates a machine code of an THUMB mode patch intermediary instruction "POP {r1,r2,pc}" and returns the generated code to the processor 102, instead of the instruction of the address (B+12), resulting in the processor 102 to direct the patching device 100 to return an instruction from the address (A+4). Details of the subsequent instruction execution may be deduced by the analogy. It is to be observed that, with the disclosed embodiments of a patching device, the flawed firmware function starting from address B is patched by the patch function starting from the instruction of address C1.

Figure 6:
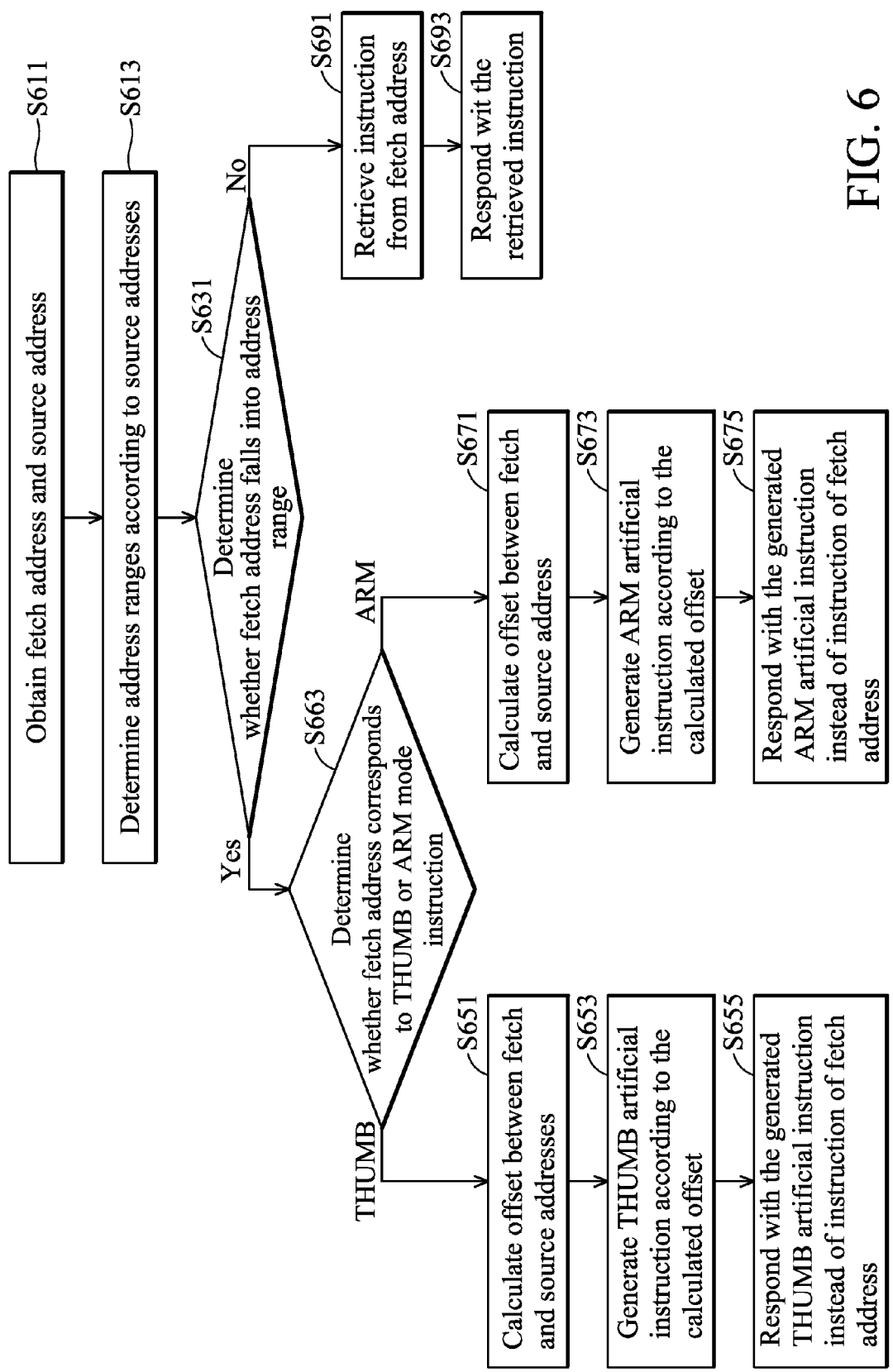
FIG. 6 is a flow chart illustrating an embodiment of a method for patching firmware functions.

FIG. 6 is a flow chart illustrating an embodiment of a method for patching firmware functions, performed by a patching device (e.g. 100 of FIG. 1). The process begins to obtain a fetch address from a processor (e.g. 102 of FIG. 1) and a plurality of source addresses from patch profile region (e.g. 108 of FIG. 1) or registers (e.g. 116 of FIG. 1), where the fetch address of a ROM code region (e.g. 106 of FIG. 1) stores an instruction of a firmware function that the processor attempts to fetch, and each source address points to the beginning address of a flawed firmware function (step S611). An address range between each source address and that plus a predetermined value (e.g. thirty-two) is determined (step S613). And then, it is determined whether the fetch address falls into one of the determined address range (step S631). The determination of this step may be achieved by a patch determination unit (e.g. 118 of FIG. 1). If so, the process proceeds to an artificial instruction providing procedure (containing at least steps S633 to S675) to generate and respond with an artificial instruction to the processor, otherwise, proceeds to a normal instruction providing procedure (containing at least steps S691 and S693) to retrieve and respond with an instruction from the fetch address to the processor. In the normal instruction providing procedure, an instruction is retrieved from the fetch address of the ROM code region (step S691), and subsequently, the retrieved instruction is responded to the processor (step S693). In the artificial instruction providing procedure, it is determined whether the fetch address corresponds to a THUMB or ARM mode instruction (step S633). The instruction mode determination for the fetch address may be achieved by inspecting a relevant bit of a mode register (e.g. 211*b* of FIG. 2A), which corresponds to the fallen address range. When the fetch address corresponds to a THUMB mode instruction, an offset between the fetch address and the source addresses forming the fallen address range is calculated (step S651), a THUMB artificial instruction, such as a THUMB patch intermediary instruction listed in Table 1, is generated according to the calculated offset (step S653), and the generated THUMB artificial instruction instead of the instruction of the fetch address is responded to the processor (step S655). Steps S651 to S653 may be performed by a THUMB instruction generator (e.g. 271 of FIG. 2G or 2H). When the fetch address corresponds to an ARM mode instruction, an offset between the fetch address and the source addresses forming the fallen address range is calculated (step S671), an ARM artificial instruction, such as an ARM patch intermediary instruction listed in Table 2, is generated according to the calculated offset (step S673), and the generated ARM artificial instruction instead of the instruction of the fetch address is responded to the processor (step S675). Steps S671 to S673 may be performed by an ARM instruction generator (e.g. 272 of FIG. 2I or 2J).

Figure 4:
FIG. 4 is a schematic diagram showing the format of a branch instruction.
Figure 7:
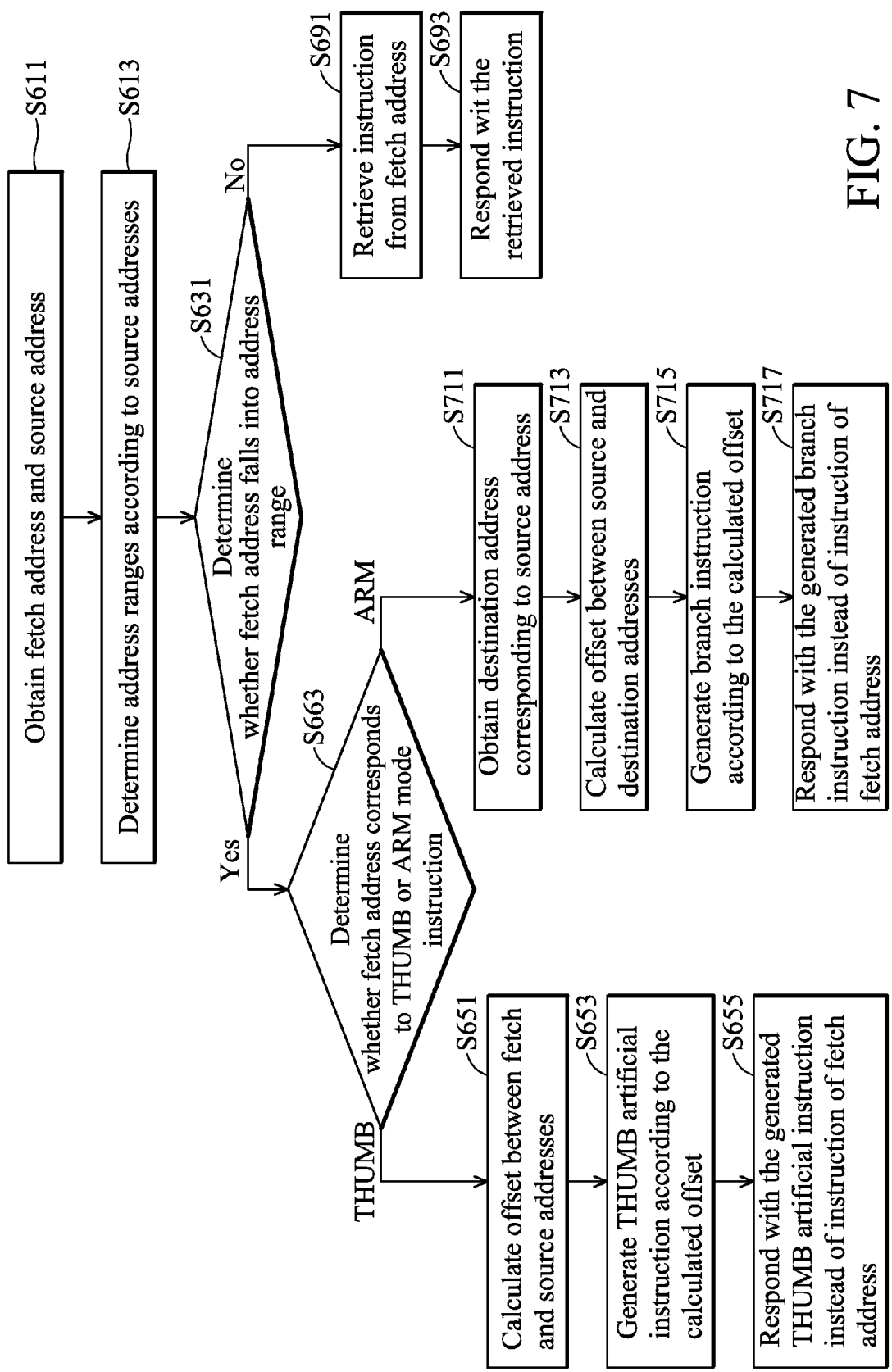
FIG. 7 is a flow chart illustrating another embodiment of a method for patching firmware functions.

FIG. 7 is a flow chart illustrating another embodiment of a method for patching firmware functions, performed by a patching device (e.g. 100 of FIG. 1). The difference between FIGS. 6 and 7 is operations after the process determines that the fetch address corresponds to an ARM mode instruction. When the fetch address corresponds to an ARM mode instruction, a destination address pointing to the beginning of a patch function of a patch function region (e.g. 110 of FIG. 1) is obtained from a patch profile region (e.g. 108 of FIG. 1) or registers (e.g. 116 of FIG. 1) (step S711), an offset between the source and destination addresses is calculated (step S713), a branch instruction, the exemplary format thereof as shown in FIG. 4, is generated according to the calculated offset (step S715), and the generated branch instruction instead of the instruction of the fetch address is responded to the processor (step S717). Steps S711 to S717 may be performed by an branch instruction generator (e.g. 291 of FIG. 2K).

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A patching device, comprising:
    a memory, comprising a read-only memory (ROM) code region storing a plurality of firmware functions, and a patch function region storing a patch function provided to substitute for one of the firmware functions;
    an instruction generator;
    a first multiplexer, coupled to the memory and the instruction generator; and
    a patch determination unit, coupled to the instruction generator and the first multiplexer, obtaining a fetch address from a processor, determining whether the fetch address corresponds to the replaced firmware function, directing the first multiplexer to output an instruction of the fetch address of the ROM code region to respond to the processor when the fetch address does not correspond to the replaced firmware function, and directing the first multiplexer to output an artificial instruction generated by the instruction generator to respond to the processor when the fetch address corresponds to the replaced firmware function,
    wherein the generated artificial instruction is one of series of machine codes corresponding to a plurality of patch intermediary instructions utilized to direct the processor to jump to the beginning address of the patch function.

2. The patching device as claimed in claim 1, wherein the instruction and the artificial instruction are 16-bit instructions.

3. The patching device as claimed in claim 1, wherein the patch intermediary instructions comprises:
    a first patch intermediary instruction, utilized to direct the processor to push a return address into a stack;
    a second patch intermediary instruction, subsequent to the first patch intermediary instruction, and utilized to direct the processor to jump to a destination address stored in a register; and
    a third patch intermediary instruction, subsequent to the second patch intermediary instruction, and utilized direct the processor to pop the return address out of the stack and jump to the return address.

4. The patching device as claimed in claim 1, further comprising a register storing a source address pointing to the beginning of the replaced firmware function, wherein the patch determination unit further comprises:
    a first comparator, coupled to the register, outputting "1" or "TRUE" when the fetch address exceeds or equals the source address;
    a second comparator, coupled to the register, outputting "1" or "TRUE" when the fetch address is lower than the source address plus a range value; and
    an AND gate, coupled to outputs of the first and second comparators, outputting "1" or "TRUE" to direct the first multiplexer to output the artificial instruction to respond to the processor when the outputs of the first and second comparators are all "1" or "TRUE", and outputting "0" or "FALSE" to direct the first multiplexer to output the address of the fetch address to respond to the processor when at least one of the outputs of the first and second comparators is not "1" or "TRUE".

5. The patching device as claimed in claim 4, further comprising a lookup table storing the machine codes corresponding to the patch intermediary instructions, wherein the instruction generator further comprises:
a subtractor, generating an offset by subtracting the fetch address from the source address; and
a data retriever, coupled to the subtractor and the lookup table, obtaining the offset from the subtractor, retrieving one machine code from the lookup table according to the obtained offset, and outputting the retrieved machine code as the artificial instruction.

6. The patching device as claimed in claim 4, further comprising a lookup table storing the machine codes corresponding to the patch intermediary instructions, wherein the instruction generator further comprises:
a plurality of code generation units, each generating one machine code;
a second multiplexer, coupled to the code generation units as inputs;
a subtractor, generating an offset by subtracting the fetch address from the source address; and
a data retriever, coupled to the subtractor and the second multiplexer, dividing the offset by the instruction length of the artificial instruction, and directing the second multiplexer to output one machine code from one code generation unit according to the dividing result as the artificial instruction.

7. The patching device as claimed in claim 1, further comprising a register storing a source address pointing to the beginning of the replaced firmware function, wherein the patch determination unit further comprises:
a comparator, coupled to the register, outputting "1" or "TRUE" when the fetch address equals the source address; and
an AND gate, coupled to an output of the comparator, outputting "1" or "TRUE" to direct the first multiplexer to output the artificial instruction to respond to the processor when the output of the comparator is "1" or "TRUE", and outputting "0" or "FALSE" to direct the first multiplexer to output the address of the fetch address to respond to the processor when the output of the comparator is not "1" or "TRUE".

8. The patching device as claimed in claim 7, wherein the instruction generator further comprises:
a branch instruction generator, obtaining the source address and a destination address pointing to the beginning of the patch function, calculating the difference between the source and destination addresses, generating a branch instruction according to the difference, and outputting the generated branch instruction as the artificial instruction,
wherein the processor, when executing the branch instruction, jumps to the destination address.

9. An electronic apparatus, comprising:
a memory, comprising a read-only memory (ROM) code region storing a plurality of firmware functions, and a patch function region storing a patch function provided to substitute for one of the firmware functions, wherein a source address points to the beginning of the replaced firmware function, and a destination address points to the beginning of the patch function;
a processor; and
an instruction providing unit, coupled to the memory and the processor, obtaining a plurality of fetch addresses from the processor, and responding with a plurality of artificial instructions to the processor when the fetch addresses from the source address do not exceed a predetermined value, the instruction providing unit further determining whether any of the fetch addresses corresponds to the replaced firmware function, directing a first multiplexer to output an instruction of the fetch address of the ROM code region to respond to the processor when the fetch address does not correspond to the replaced firmware function, and directing the first multiplexer to output an artificial instruction generated by the instruction generator to respond to the processor when the fetch address corresponds to the replaced firmware function, wherein the generated artificial instruction is one of series of machine codes corresponding to a plurality of patch intermediary instructions utilized to direct the processor to jump to the destination address.

10. The electronic apparatus as claimed in claim 9, wherein the patch intermediary instructions comprises:
a first patch intermediary instruction, utilized to direct the processor to push a return address into a stack;
a second patch intermediary instruction, subsequent to the first patch intermediary instruction, and utilized to direct the processor to jump to a destination address stored in a register; and
a third patch intermediary instruction, subsequent to the second patch intermediary instruction, and utilized direct the processor to pop the return address out of the stack and jump to the return address.

11. The electronic apparatus as claimed in claim 10, wherein the register is an 32-bit register.

12. A method for utilizing a patch function to substitute for at least one of plurality of firmware functions stored in a read-only memory (ROM) code region, comprising:
obtaining a fetch address from a processor;
obtaining a source address pointing to the beginning of the replaced firmware function and a destination address points to the beginning of the patch function;
determining whether the fetch address falls into an address range between the source address and the source address plus a predetermined value;
generating and responding with an artificial instruction to the processor when the fetch address falls into the address range; and
fetching and responding with an instruction from the fetch address to the processor when the fetch address does not fall into the address range, wherein the generated artificial instruction is one of series of machine codes corresponding to a plurality of patch intermediary instructions utilized to direct the processor to jump to the destination address.

13. The method as claimed in claim 12, wherein the step for generating and responding with an artificial instruction further comprises:
determining whether the fetch address corresponds to an 16-bit instruction or an 32-bit instruction when the fetch address falls into the address range;
generating and responding with an 16-bit machine code corresponding to a first patch intermediary instruction to the processor when the fetch address corresponds to an 16-bit instruction; and
generating and responding with an 32-bit machine code corresponding to a second patch intermediary instruction to the processor when the fetch address corresponds to an 32-bit instruction.

14. The method as claimed in claim 13, wherein the step for generating and responding with an 16-bit artificial instruction further comprises:
calculating an offset between the fetch and source addresses;

selecting one from plurality of 16-bit machine codes corresponding to the first patch intermediary instructions according to the calculated offset; and responding with the selected 16-bit machine code to the processor as the artificial instruction.

15. The method as claimed in claim 13, wherein the step for generating and responding with an 32-bit artificial instruction further comprises:

calculating an offset between the fetch and source addresses;

selecting one from plurality of 32-bit machine codes corresponding to the second patch intermediary instructions according to the calculated offset; and responding with the selected 32-bit machine code to the processor as the artificial instruction.

16. The method as claimed in claim 13, wherein step for generating and responding with an 32-bit artificial instruction further comprises:

obtaining a destination address pointing to the beginning of a patch function;

calculating an offset between the source and destination addresses;

generating a branch instruction according to the calculated offset; and responding with the generated branch instruction to the processor.

17. The method as claimed in claim 16, wherein, when executing the branch instruction, the processor directly jumps to the destination address.

18. The method as claimed in claim 13, wherein the first patch intermediary instruction is a THUMB mode instruction and the second patch intermediary instruction is an ARM mode instruction.

* * * * *